United States Patent [19]

Barth

[11] 4,217,975
[45] Aug. 19, 1980

[54] CURRENT COLLECTOR FOR AMUSEMENT PARK BUMPER CARS

[76] Inventor: Ludwig Barth, Kreuznacherstr 29, 6555 Sprendlingen, Fed. Rep. of Germany

[21] Appl. No.: 877,842

[22] Filed: Feb. 15, 1978

[30] Foreign Application Priority Data

Feb. 17, 1977 [DE] Fed. Rep. of Germany ....... 2706724

[51] Int. Cl.² .............................................. B60M 1/00
[52] U.S. Cl. ..................................... 191/13; 180/2 R
[58] Field of Search ................. 191/13, 56, 63.3, 63.4, 191/63.5, 64, 72; 180/2; 273/118 A; 46/253, 262; 16/18 CG, 44, 46, 48; 239/121; 15/248 R, 248 A; 294/131; 228/21; 145/78

[56] References Cited

U.S. PATENT DOCUMENTS

| 593,847 | 11/1897 | Kirsch | 191/64 |
|---|---|---|---|
| 1,478,979 | 12/1923 | Stoehrer | 191/13 |
| 1,760,020 | 5/1930 | Stalder | 191/56 |
| 3,748,683 | 7/1973 | Smith | 15/248 A |

Primary Examiner—Trygve M. Blix
Assistant Examiner—Reinhard J. Eisenzopf
Attorney, Agent, or Firm—Max Fogiel

[57] ABSTRACT

A current collector arrangement for amusement park bumper cars in which current for the driving motor of the car is taken from a wire mesh stretched overhead. The current is conducted by a current collector tube and returned to the floor provided with metal panels. A roller is located at a substantially small distance from the collector tube, for the purpose of collecting current from the wire mesh. The roller is mounted in a freely rotating spring-supported mounting with concave-turned surface, and the major portion of the roller is enclosed by a bowl. The bowl, furthermore, is coated on the inside with an adhesive-saturated felt lining. The bowl may also be lined on the inside with magnetic material. The mounting has a rod sliding in the collector tube, and in the end region of the rod, there are two relatively short arms attached at right angles for holding the axle of the roller. The rod, moreover, is enclosed by a spring between the end of the current collector tube and a ring attached to the rod. The axle of the roller may be supported in non-conducting bearings in the arms of the mounting, and current transfer from the roller to the mounting may be carried out by associated contact springs or pins associated with the roller axle.

3 Claims, 4 Drawing Figures

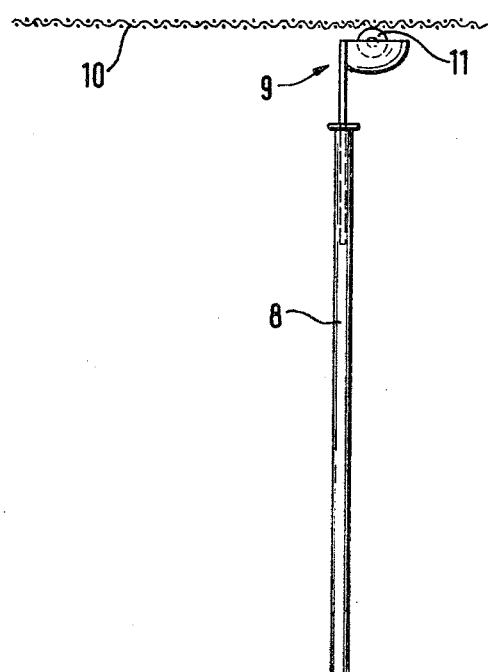
FIG. 1
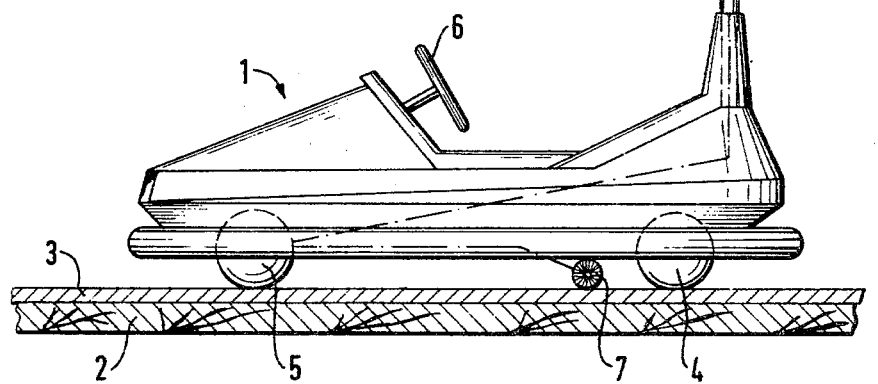

CURRENT COLLECTOR FOR AMUSEMENT PARK BUMPER CARS

BACKGROUND OF THE INVENTION

The present invention relates to a current collector for an amusement park bumper car where the current for the drive motor is taken from an overhead wire mesh and is returned to the floor which is composed of metal panels.

It is known from German Laid Open Document No. 1,208,667 how to use for collecting current, a sliding bow, made of steel wire and sliding during travel along the underside of the wire mesh. The contact area is extremely small since the sliding bow as a rule touches only one wire of the wire mesh. At this point of contact between these parts, because of unevenesses in the wire mesh and because of the brief separation of the sliding bow from the wire mesh, sparks will develop and cause the sliding bow to have a rough surface. Because of the increased friction, this rough surface of the sliding bow abrades the wire mesh so much that it is worn through in a relatively short time. In addition, the metal abrasion which drops from the wire mesh in small chips, frequently leads to eye injuries to users of the amusement park bumper car.

An improved current collector for bumper cars is known from the German Laid Open Document No. 1,262,850. For collecting the current from the wire mesh, it uses a collector wheel which has a wheel rim of hard copper and has a diameter so large that at least three mesh wires of the wire mesh simultaneously touch its circumference. To be sure, such a collector wheel touches the wire mesh simultaneously at several points, and through the softness of its wheel rim takes care that the individual wires of the wire mesh, under the pressure of the current collector wheel, dig into the wheel rim; in comparison to the known sliding bow, because of the change from sliding friction into rolling friction, the abrasion is reduced. But here is still a certain amount of abrasion whose particles may injure the eyes of the bumper car user and attending personnel. The collector wheel is freely rotatable and mounted on a long spring-loaded arm which is mounted freely rotatable in a vertical current collector tube attached to the bumper car. The use of this spring-supported long arm for mounting the wheel has an unfavorable effect since in case of collision of two cars the wheel slides sideways over the wire mesh, causing heavy spark formation and abrasion of the wire mesh. Also, it has been found through experience that the contact points achieved with the known collector wheel are not sufficient to avoid spark formation with adequate safety.

It is, therefore, an object of the present invention to provide a current collector of the above type of simple construction, to ensure optimum contact between wire mesh and collector element with extensive prevention of spark formation, and to safely eliminate dropping of metal abrasion.

Another object of the present invention is to provide a current collector arrangement of the foregoing character which may be economically fabricated and readily maintained in service.

A further object of the present invention is to provide a current collector arrangement, as described, which has a substantially long operating life.

SUMMARY OF THE INVENTION

The objects of the present invention are achieved by providing that a roller with a convexly turned surface collects the current from the wire mesh and is mounted a short distance from the current collector tube in a freely rotating elastic mounting; a major portion of the roller is enclosed by a bowl.

In a further embodiment of the invention, to prevent dropping the metal abrasion collected in the bowl, the bowl is lined on the inside with an adhesive-saturated felt coating or with a magnetic material.

Preferably, the mounting comprises a rod sliding in the current collector tube, having two relatively short arms for holding the axis of the roller; between the end of the current collector tube and a ring attached to the rod, the rod is enclosed by a helical spring.

According to another embodiment of the present invention, to increase the life of the bearings for the roller, the axis (axle) of the roller is mounted in non-conducting bearings in the arms of the mounting, and the current transfer from the roller to the mounting is made by means of suitable contact springs or pins associated with the roller axis.

The advantages achieved with the invention are the increased contact area between wire mesh and convexly-turned roller, combined with short distance between roller and current collector tube, virtually preventing spark formation even if the bumper cars collide, and safely catching (collecting) the resulting metal abrasion in the bowl enclosing the roller, thereby eliminating eye injuries to bumper car users. The extensive avoidance of spark formation also ensures increased life of the wire mesh.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows an overall view of the major components of a bumper car installation with a bumper car equipped in accordance with the invention;

DESCRIPTION OF THE PREFERRED EMBODIMENTS

Figure 2:
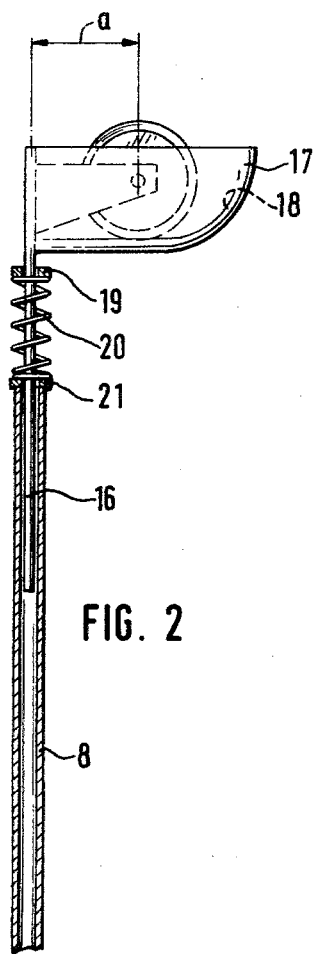
FIG. 2 shows an enlarged view of the current collector for the bumper car of FIG. 1.
Figure 3:
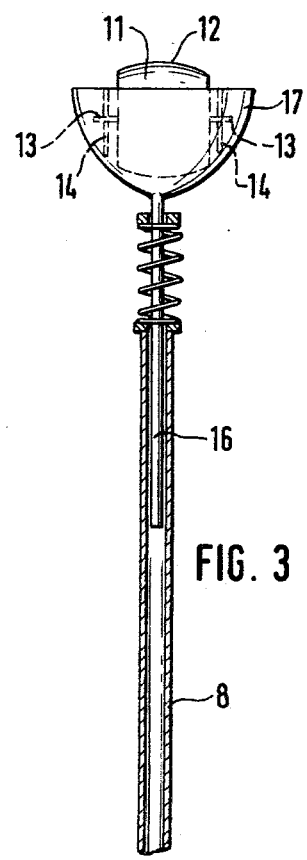
FIG. 3 shows a front view of the current collector of FIG. 2.
Figure 4:
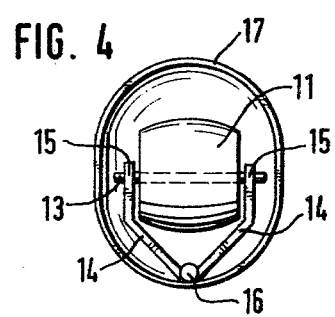
FIG. 4 shows a top view of the current collector of FIG. 3.

The bumper car park comprises a number of bumper cars 1 which travel across the floor 2 with metal paneling 3. Each bumper car 1 has two rear wheels 4 which are not driven and are not steerable. One or two front wheels 5 are driven by an electric motor which preferably is a barrel-type motor, and are steered by steering wheel 6. The contact with the current-conducting metal paneling 3 is a freely rotating roller-like steel brush 7 whose circumference is held by spring pressure against the floor. Current is delivered to the drive motor of bumper car 1 via the vertical current collector tube 8 on which a spring supported, freely rotating mounting 9 for the roller 11 contacting wire mesh 10 is attached. The roller 11 whose surface 12 is convexly turned is supported with its axis 13 in non-conducting bearings 15 mounted in the arms 14 of mounting 9. Current transfer from the axis 13 of roller 11 to the arms 14 of mounting 9 is made via contact springs or pins (not shown). The arms 14 are attached to a rod 16 which slides and rotates freely in the current collector tube 8. The distance a between the axis 13 of roller 11 and the axis of the current collector tube 8 is a minimum. The arms 14, mounted at right angles on rod 16, and the major portion of roller 11 supported by these arms are enclosed by a bowl 17 also fastened to rod 16. The inside 18 of bowl 17 is coated with a layer of magnetic material. Underneath the bowl 17, the rod 16 has a ring 19 fastened to it which contacts a spring 20 enclosing the rod 16. The other end of the spring is in contact with end 21 of the current collector tube 8. This spring 20 provides continuous contact of the concave-turned roller 11 with wire mesh 20.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. A current collector arrangement for an amusement park bumper car, comprising: a wire mesh stretched overhead above said bumper car; a collector tube for collecting current from said wire mesh; a floor with metal panels to which current to conducted from said wire mesh; roller means at substantially small distance from said collector tube for collecting current from said wire mesh; freely rotating spring-supported mounting means for mounting said roller means; said roller means having a convex-turned surface; and a bowl for enclosing a major portion of said roller means; said roller means with said convex surface maintaining contact with said wire mesh along areas of support of said wire mesh when said wire mesh sags between said areas of support, said bowl being fixed to said mounting means so that the opening of said bowl is held substantially parallel with said wire mesh during movement of said collector tube with said bumper car; said mounting means comprising further a rod sliding in said current collector tube; two relatively short arms in the end region of said rod and attached at right angles for holding an axle of said roller means.

2. A current collector arrangement for an amusement park bumper car, comprising: a wire mesh stretched overhead above said bumper car; a collector tube for collecting current from said wire mesh; a floor with metal panels to which current is conducted from said wire mesh; a roller means at a substantially small distance from said collector tube for collecting current from said wire mesh; freely rotating spring-supported mounting means for mounting said roller means; said roller means having a convex-turned surface; and a bowl for enclosing a major portion of said roller means; said roller means with said convex surface maintaining contact with said wire mesh along areas of support of said wire mesh when said wire mesh sags between said areas of support, said bowl being fixed to said mounting means so that the opening of said bowl is held substantially parallel with said wire mesh during movement of said collector tube with said bumper car; said mounting means including a rod; a ring attached to said rod; and spring means enclosing said rod between an end of said current collector tube and said ring attached to said rod, said rod sliding inside said current collector tube.

3. A current collector arrangement for an amusement park bumper car, comprising: a wire mesh stretched overhead above said bumper car; a collector tube for collecting current from said wire mesh; a floor with metal panels to which current is conducted from said wire mesh; roller means at a substantially small distance from said collector tube for collecting current from said wire mesh; freely rotating spring-supported mounting means for mounting said roller means; said roller means having a convex-turned surface; and a bowl for enclosing a major portion of said roller means; said roller means with said convex surface maintaining contact with said wire mesh along areas of support of said wire mesh when said wire mesh sags between said areas of support, said bowl being fixed to said mounting means so that the opening of said bowl is held substantially parallel with said wire mesh during movement of said collector tube with said bumper car; supporting arm means fixedly attached to said mounting means and supporting said roller means at a substantially fixed horizontal distance from said collector tube; said mounting means comprising further a rod/sliding in said current/collector tube; said supporting arm means comprising two relatively short arms in the end region of said rod and attached at substantially right angles for holding an axle of said roller means; a ring attached to said rod; and spring means enclosing said rod between an end of said current collector tube and said ring attached to said rod.

* * * * *